US 6,620,376 B1

(12) United States Patent
Koch et al.

(10) Patent No.: US 6,620,376 B1
(45) Date of Patent: Sep. 16, 2003

(54) SOFT MAGNETIC MATERIAL AND METHOD FOR MANUFACTURING IT

(75) Inventors: Hans-Peter Koch, Stuttgart (DE); Andreas Harzer, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 09/856,398

(22) PCT Filed: Sep. 5, 2000

(86) PCT No.: PCT/DE00/03041
§ 371 (c)(1),
(2), (4) Date: May 22, 2001

(87) PCT Pub. No.: WO01/22439
PCT Pub. Date: Mar. 29, 2001

(30) Foreign Application Priority Data

Sep. 23, 1999 (DE) .......................... 199 45 592

(51) Int. Cl.[7] ............... B22F 3/00; B22F 3/08
(52) U.S. Cl. .......................... 419/64; 419/66
(58) Field of Search ............... 419/48, 64, 66; 148/306

(56) References Cited

U.S. PATENT DOCUMENTS 5,112,801 A * 5/1992 Nellis et al. .......... 505/1
5,348,800 A * 9/1994 Moro et al. .......... 428/328
5,352,522 A * 10/1994 Kugimiya et al. .......... 428/403
5,529,746 A 6/1996 Knoss et al.

FOREIGN PATENT DOCUMENTS

| DE | 34 39 397 | 4/1986 |
| DE | 44 07 593 | 10/1995 |
| EP | 0 088 992 | 9/1983 |

OTHER PUBLICATIONS

"Fundamental Principles of Powder Metallurgy," W.D. Jones, Edward Arnold (Publishers) Ltd, pp. 386–387, 1960.*
*Patent Abstracts of Japan, vol. 005, No. 007 (E–041), Jan. 17, 1981 & JP 55 138205A (Nippon Kinzoku KK), Oct. 28, 1980.

* cited by examiner

Primary Examiner—Daniel J. Jenkins
(74) Attorney, Agent, or Firm—Kenyon & Kenyon

(57) ABSTRACT

A soft magnetic material, and a method for manufacturing it, which is suitable, e.g., for use in solenoid valves is described. The individual powder particles of a metallic powdery initial component are equipped superficially at least largely with a high-resistance surface layer and the powder particles are densified into the material. Upon densification of the powdery metallic initial component into the soft magnetic material, the surface layers of the powder particles are additionally at least locally welded to one another. Welding can be achieved using shock densification.

9 Claims, 1 Drawing Sheet

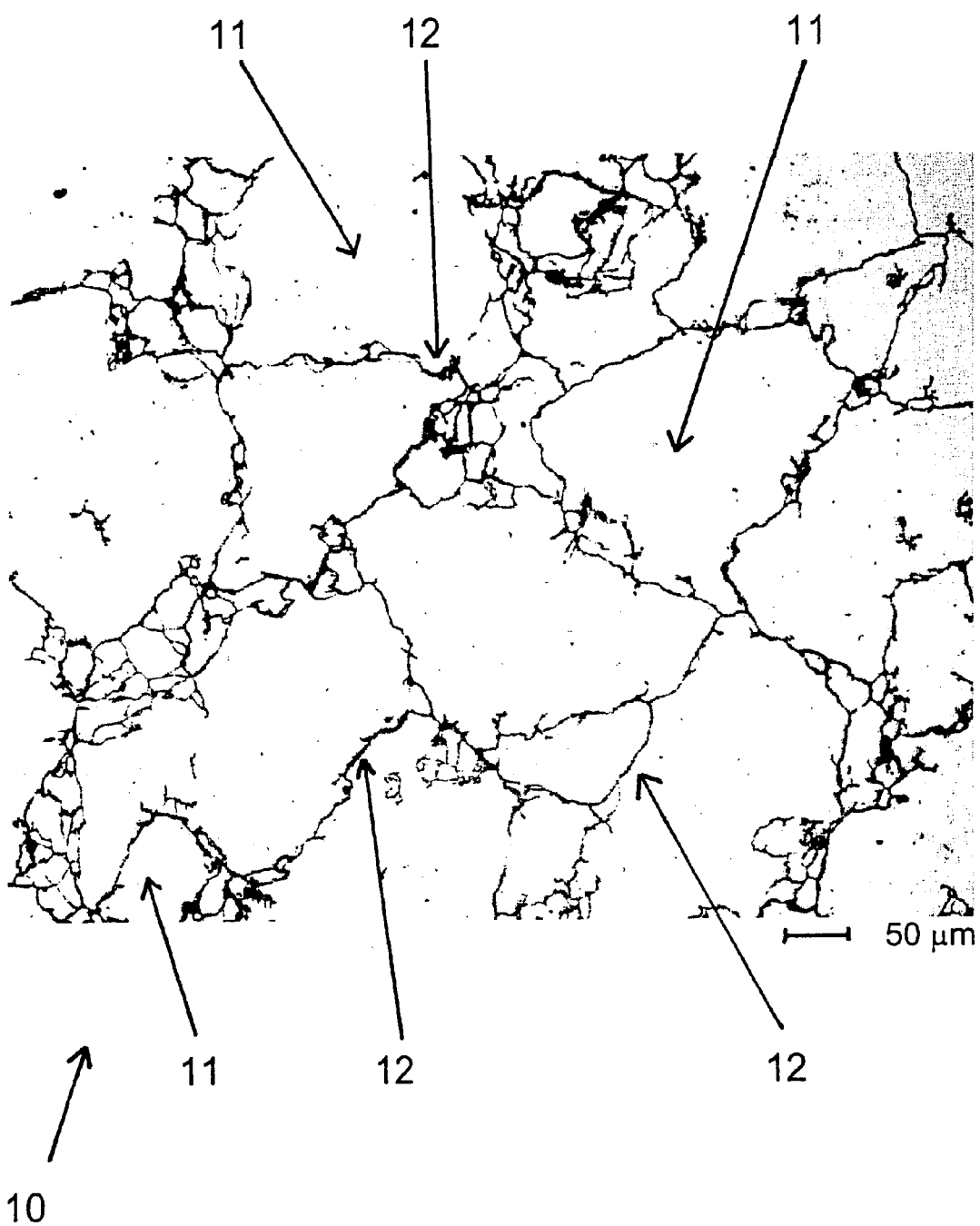

SOFT MAGNETIC MATERIAL AND METHOD FOR MANUFACTURING IT

FIELD OF THE INVENTION

The present invention concerns a soft magnetic material and a method for producing a soft magnetic material, in particular for use in solenoid valves.

BACKGROUND INFORMATION

Modern gasoline and diesel engines require increasingly high-performance solenoid injection valves in order to meet requirements for reducing fuel consumption and pollutant emissions. Fast-switching solenoid valves are needed in order to achieve these goals.

To implement these valves, soft magnetic materials with a high specific electrical resistance are utilized, for example, sintered FeSi, FeCr, or FeCo alloys, or soft magnetic composite materials comprising powdery iron and an organic binder.

Such soft magnetic composite materials often have a low mechanical stability and they are not sufficiently resistant to fuel and to high temperatures. In addition, in the case of the iron alloys which are obtained by sintering powdery materials, the only way to manufacture them with a specific electrical resistance of more than 1 $\mu\Omega$m is by way of alloying techniques.

One approach to increasing the specific electrical resistance of iron alloys is to coat a pure iron or iron-alloy powder with an electrically insulating layer before pressing, and then to sinter the compact into a mechanically stable shaped part.

The shaped parts obtained in this fashion have insufficient mechanical strength. In addition, during sintering, it is often not possible to retain the electrically insulating layer that was previously produced, so as to establish the desired high specific electrical resistance. Further, in the case of iron powders or iron-alloy powders, conventional simple pressing and sintering methods yield only limited densities, up to a maximum of 7.3 g/cm³, which are associated with a volume ratio of less than 92 vol % of the theoretical limit for the finished shaped parts.

German Patent Application No. DE 44 07 593 C1 describes a method for manufacturing high-density powder compacts. For this purpose, a conventional static pressing of pure iron powder in a die has superimposed on it a second process step in which the compact is acted upon during densification by brief pulses of current. This method is referred to in German Patent Application No. DE 44 07 593 as "shock densification."

SUMMARY OF THE INVENTION

The present invention provides a soft magnetic material and a method for manufacturing the soft magnetic material. Embodiments of the present invention materials and method for manufacturing such materials having a highly dense and mechanically stable-shaped parts having extraordinarily good soft-magnetic properties.

In an embodiment of the present invention, the soft magnetic material that is manufactured has a high saturation polarization as well as very high specific electrical resistance values compared to iron materials and iron alloys produced by melting metallurgy. This high specific electrical resistance results, by way of the consequent decrease in eddy-current losses, in much-improved switching dynamics, for example, in solenoid valves.

In embodiments of the present invention, the soft magnetic materials that are obtained are moreover highly dimensionally stable, but can nevertheless also easily be mechanically reworked if necessary.

In addition, certain embodiments of the present invention can have a very high material density of more than 7.4 g/cm³, in particular more than 7.6 g/cm³.

Because the individual powder particles of the metallic powdery initial component are welded to one another by way of their high-resistance surface layers, the soft magnetic material that is obtained according to the present invention is mechanically very stable, temperature-resistant, and fuel-resistant.

In embodiments of the present invention, the metallic powdery initial component can be inexpensively obtainable commercially, and can easily be prepared for the method of the present invention.

In a further embodiment of the present invention, powders whose average particle size is more than 50 $\mu$m, for example, between 100 $\mu$m and 500 $\mu$m, are used as initial powders.

In a further embodiment of the present invention, the average particle size of the powder particles of the metallic initial component is considerably greater than the thickness of the high-resistance surface layer. The highest possible proportion of powdery, e.g., ferritic or ferromagnetic initial component, relative to the high-resistance surface layer, can thereby be obtained in the soft magnetic material.

In the method according to the present invention, a sintering step or sintering operation that is otherwise usual in powder metallurgy can be omitted. Instead, the insulating layers on the surfaces of the individual powder particles are welded to one another by shock densification rather than being destroyed, which is unavoidable in the case of sintering.

In a further embodiment, particularly suitable as the metallic powdery initial component is a pure iron powder or iron-alloy powder that is then equipped superficially with a high-resistance layer, for example, an oxide layer made of $Fe_3O_4$ In order to establish a desired specific electrical resistance, this high-resistance surface layer may have a thickness of 1 $\mu$m to 10 $\mu$m.

Because the high-resistance surface layer that is present or produced at the surface of the initial powder particles is largely retained after the coated powder particles are densified into the soft magnetic material, and because the high-resistance surface layers between the individual powder particles are welded to one another by shock densification, a specific electrical resistance of more than 1 $\mu\Omega$m, in particular more than 2 $\mu\Omega$m, in the material is obtained.

In embodiments of the present invention, in the shaping of the powder particles of the metallic powdery initial component equipped with the high-resistance surface layer, the latter is placed in conventional fashion into a die, and densified by uniaxial pressing at a pressure of 200 MPa to 800 MPa. This shaping step can have superimposed on it the actual shock densification of the powder particles equipped with the high-resistance surface layer. For that purpose, pressing and shock densification of the compacts are performed in the die in one process step.

BRIEF DESCRIPTION OF THE DRAWINGS

The FIGURE shows an optical-microscope image of the structure of a soft magnetic material.

DETAILED DESCRIPTION

A commercially available pure iron or iron-alloy powder, for example, an FeCr, FeSi, FeNi, or FeCo alloy powder, is provided. Coarse powders having a particle size exceeding 50 µm may be used in order to maximize the volume proportion of this powder constituting a metallic powdery initial component in the shaped part that is later obtained.

In the exemplary embodiment shown in the FIGURE, ordinary standard powders, for example, those designated ASC, ABC, ABM, or Somaloy 500 of the Höganäs company (Sweden), made up of metallic powder particles 11 whose average particle size is initially set at more than 100 µm by sieving out the fines, are provided.

This metallic powder is then first equipped superficially with a high-resistance surface layer 12. An oxide layer, e.g., an $Fe_3O_4$ layer, can be high-resistance surface layer 12. A silicon- or phosphate-containing layer can also be appropriate.

A "high-resistance surface layer 12" is a layer whose specific electrical resistance is considerably higher than the specific electrical resistance of the metallic powdery initial component or of powder particles 11, or whose specific electrical resistance is comparable, at least in terms of order of magnitude, to the specific electrical resistance of $Fe_3O_4$.

Production of the $Fe_3O_4$ layer, constituting high-resistance surface layer 12, on powder particles 11 is preferably accomplished by introducing water vapor into a chamber furnace or continuous furnace at temperatures of approximately 550° C.

In the context of this surface treatment method, known in powder metallurgy and referred to as "steam bluing," the thickness of the $Fe_3O_4$ layers that are produced can be adjusted by way of the quantity of water vapor introduced into the furnace and its contact time.

If, alternatively, a silicon- or phosphate-containing high-resistance surface layer 12 is to be produced on powder particles 11, this can, however, also be accomplished in known fashion by chemical or electrochemical deposition.

Once powder particles 11 of the metallic powdery initial component have been equipped with high-resistance surface layer 12, that powder is placed into a die and densified by uniaxial pressing. During pressing, a shock densification is simultaneously performed in the manner described in, for example, German Patent Application No. DE 44 07 593, by the application of brief pulses of current to the compact. Surface layers 12 of powder particles 11 are thereby at least locally welded to one another.

In a further embodiment of the present invention, one to three current pulses are used in shock densification, each lasting for $5*10^{-5}$ to $5*10^{-1}$ seconds and having an amperage of 10 kA to 200 kA relative to 1 $cm^2$ of pressed area.

In a further embodiment of the present invention, the densification of powder particles 11 equipped with high-resistance surface layer 12 in the die, and the shock densification by means of current pulses, in two separate process steps, although this is more complex, may be performed.

After the shock densification of powder particles 11 equipped with high-resistance surface layers 12, the result is a soft magnetic material 10 that can then, for example, be used in solenoid valves, be additionally processed and also, if necessary, mechanically reworked. In addition, in order to improve corrosion resistance, superficial coating of the resulting soft magnetic material or of the shaped part manufactured therewith can also be performed.

Another exemplary embodiment of the present invention is a method for manufacturing a soft magnetic material 10 in the form of circular blanks with a diameter of 15 mm and a height of 15 mm, and to the physical properties obtained in those blanks.

First, a pure iron powder designated ABC 100.30 of the Höganäs company, Sweden, is used. The fines having a particle size smaller than 125 µm are removed from it by sieving. This initial powder is then, after the creation of high-resistance surface layer 12 by steam bluing as already explained above, pressed in a die at 80 kN relative to the circular end surface of the circular blanks (15 mm diameter). During pressing, shock densification is simultaneously performed in the die with two current pulses of approx. 70 kA and 120 kA, in the manner described in, for example, German Patent Application No. DE 44 07 593.

The resulting circular blanks and soft magnetic material 10 then exhibit the following properties:

Density $(g/cm^3)$:7.6

Saturation polarization $J_s$ (T):1.87

Coercivity field strength $H_c$ (A/cm):3.1–3.3

Specific electrical resistance $(\mu\Omega m)$:2.4–2.6

What is claimed is:

1. A method for producing a soft magnetic material, comprising the steps of:
    a) providing a metallic powdery initial component having powder particles;
    b) equipping the powder particles with a superficial high-resistance surface layer;
    c) densifying the powder particles in a die under elevated pressure; and
    d) shock densifying the powder particles in the die with at least one current pulse.

2. The method according to claim 1, wherein steps c) and d) are performed simultaneously.

3. The method according to claim 1, wherein at least one of step c) and step d) is performed in the die by uniaxial pressing at a pressure of 200 MPa to 800 MPa.

4. The method according to claim 1, wherein the powder particles of the metallic powdery initial component are equipped with the superficial high-resistance surface layer by at least one of an oxidation in a water vapor at an elevated temperature, an oxidation in a water vapor at 500° C. to 600° C., a chemical deposition, and an electrochemical deposition.

5. The method according to claim 4, further comprising:
    adjusting a thickness of the superficial high-resistance surface layer by way of at least one of a quantity of the water vapor and a contact time of the water vapor.

6. The method according to claim 1, wherein during step d), the superficial high-resistance surface layers of the powder particles are locally welded to one another.

7. The method according to claim 1, further comprising:
    at least one of (i) mechanically reworking the soft magnetic material and (ii) equipping the soft magnetic material with a corrosion protection layer.

8. The method according to claim 1, further comprising:
    providing one to three current pulses over a duration of $5*10^{-5}$ s to $5*10^{-1}$ s.

9. The method according to claim 8, wherein the current pulses have an amperage of 10 kA to 200 kA relative to 1 $cm^2$ of pressed area.

* * * * *